Nov. 13, 1962

L. SCHNEIDER 3,063,543

BEARING SHELL ORIENTING DEVICE

Filed Feb. 15, 1960

INVENTOR.
Leon Schneider
BY
Wilson, Lewis & McRae
ATTORNEY

Nov. 13, 1962 L. SCHNEIDER 3,063,543
BEARING SHELL ORIENTING DEVICE
Filed Feb. 15, 1960 3 Sheets-Sheet 2

INVENTOR.
Leon Schneider
BY
Wilson, Lewis & McRae
ATTORNEY

Nov. 13, 1962  L. SCHNEIDER  3,063,543
BEARING SHELL ORIENTING DEVICE
Filed Feb. 15, 1960  3 Sheets-Sheet 3
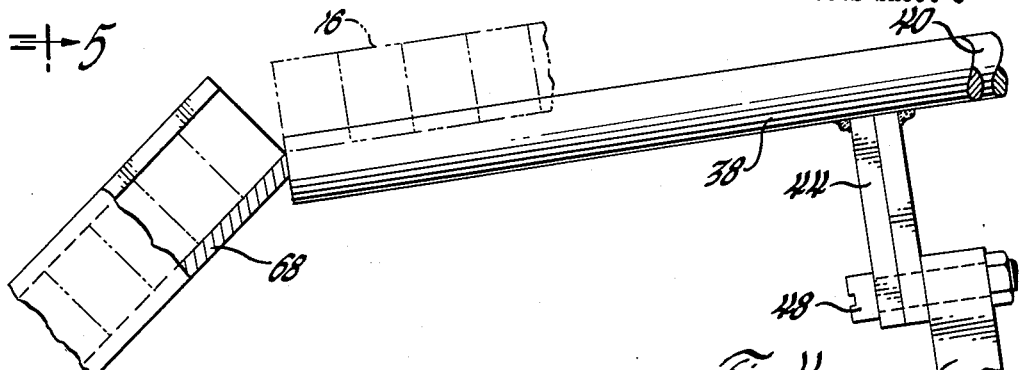
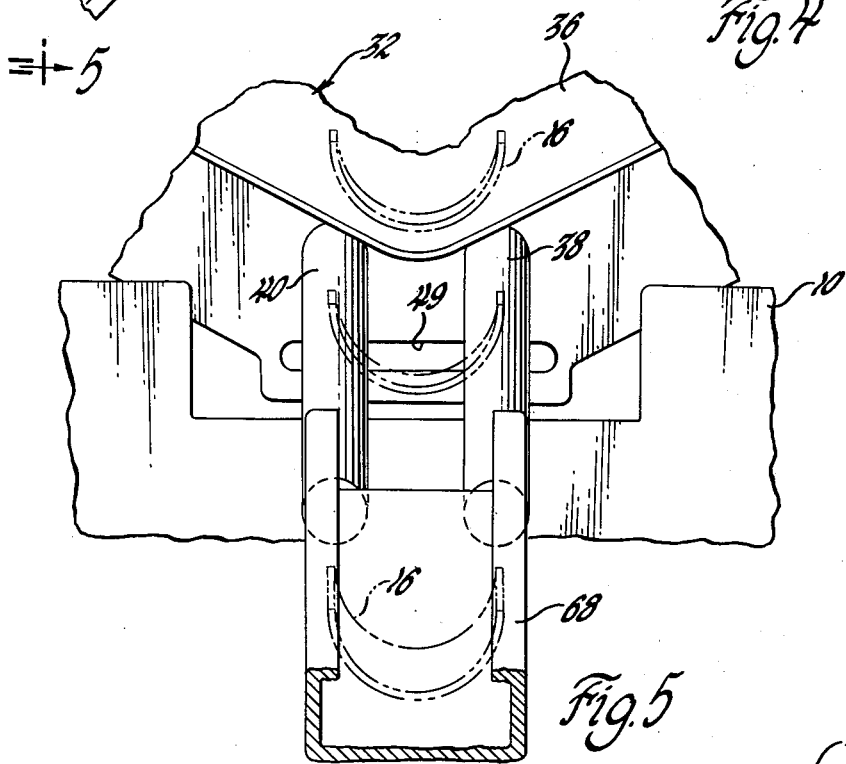
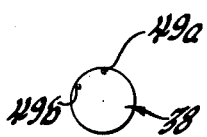
INVENTOR.
Leon Schneider
BY
Wilson, Lewis & McRae
ATTORNEY United States Patent Office 3,063,543
Patented Nov. 13, 1962

3,063,543
BEARING SHELL ORIENTING DEVICE
Leon Schneider, Oak Park, Mich., assignor to Detroit Aluminum & Brass Corporation, Detroit, Mich., a corporation of Michigan
Filed Feb. 15, 1960, Ser. No. 8,795
21 Claims. (Cl. 198—33)

This invention relates to devices for arranging irregular objects from a disordered mass or from random positions, into a desired uniform orientation, for feeding to processing machines, for example. The problem from which this invention arose is that bearing shells which are in the form of thin-walled half cylinders of relatively large radius and of relatively short axial length are presented, at various stages of their manufacture, in a disordered mass, and they must be presented in a precise orientation to some machine which performs some specific operation on the shells. Their shape and fragility make conveying and handling by machine difficult. Part of the difficulty is due to the inherent shape of the shells which are hollow and symmetrical with respect to one plane but asymmetrical with respect to a plane at 90 degrees to the first plane. This make the shells apt to tangle or assemble in a coherent mass and makes the shells unresponsive to all of the previously known sorting and orienting devices which have come to my attention.

One example of the shells discussed above is a half bearing for internal combustion engines used for crankshaft and piston rod bearings. Each shell is an almost complete, or complete, axial half of a thin-walled cylinder used to support the metal which forms the actual bearing surface.

The objects of the invention include in general the provision of an improved automatic machine which will effectively and efficiently orient such bearing shells. More specific objects will be apparent as the description proceeds.

Other objects of this invention will appear in the following description and appended claims, reference being had to the accompanying drawings forming a part of this specification wherein like reference characters designate corresponding parts in the several views.

In the accompanying drawings:

FIG. 4 is a side elevation of an alternative form of discharge chute to be used with the machine shown in FIGS. 1 and 2.

FIG. 5 is an end elevation of the chute shown in FIG. 4, and FIG. 6 is a diagram illustrating a kinematic principle utilized in one feature of the invention.

FIG. 7 is a diagram of a supporting rod or rail showing where the shells contact the rail.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
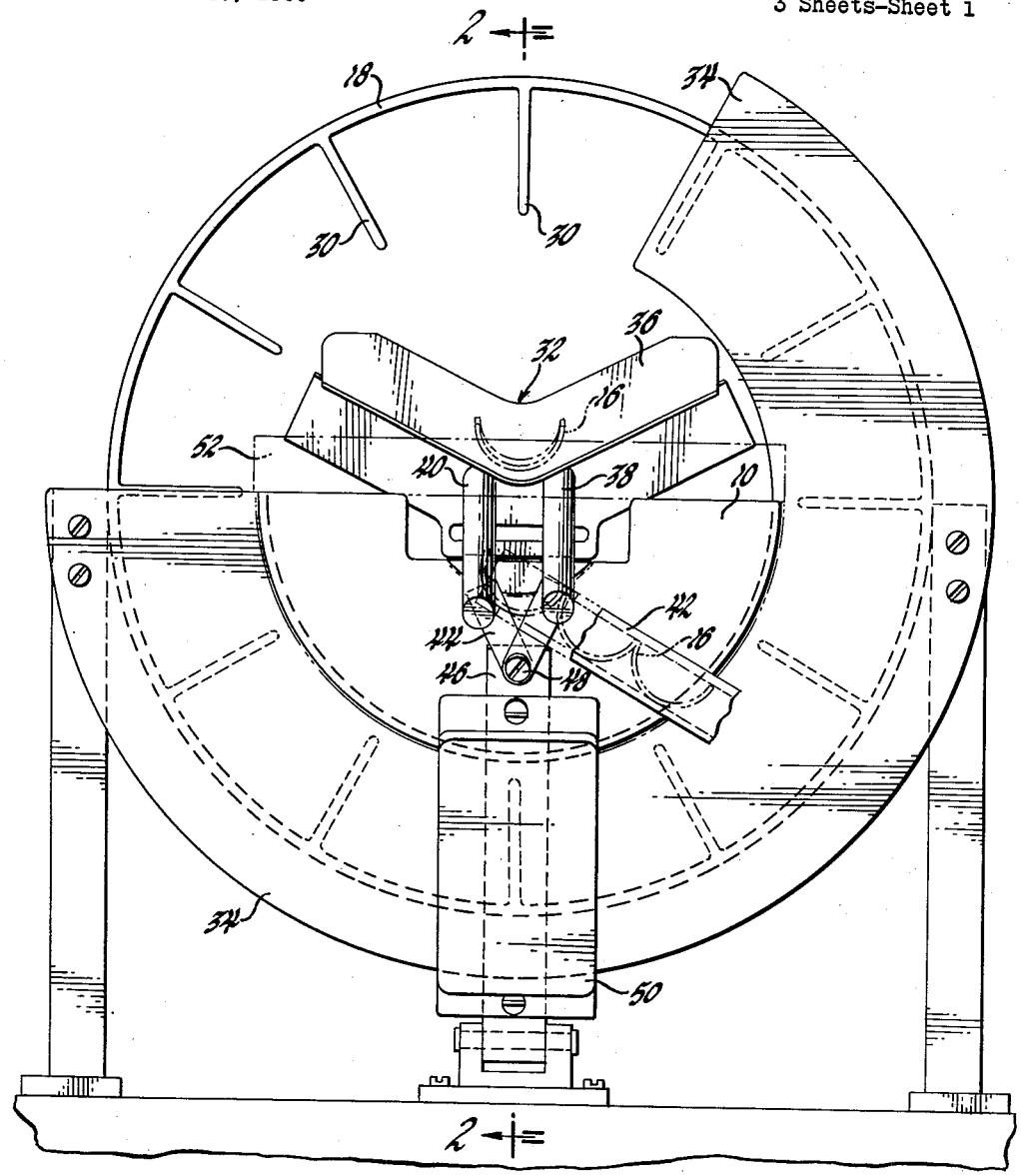
FIG. 1 is an end elevation of a bearing shell arranging machine embodying one form of my invention, some parts being removed for clarity of illustration.

Referring to the drawings, a supply bin 10 (FIG. 2) having a sloping bottom 12 is supplied with a disordered mass of bearing shells 16, the particular shape of which is shown in perspective in FIG. 1. The shells slide by gravity from the open right hand end of the supply bin into a feed drum 18 fixed to a horizontal shaft 20 which supports the drum in a bearing 24. The drum is rotated by a belt pulley 26 driven by a motor 28. It will be understood that suitable reduction speed drive may be interposed between the driving motor 28 and the shaft 20.

The right hand end of the feed drum is closed and the left hand end is open. Radial baffles 30 extend inward from the circumferential wall of the drum. As the drum is rotated bearing shells are carried by the baffles nearly to the top of the drum, where they drop onto a trough or chute 32 which projects into the open end of the drum. If desired a shroud 34 may enclose most of open end of the drum near its rim to prevent shells from falling out before they can drop into the chute.

Figure 3:
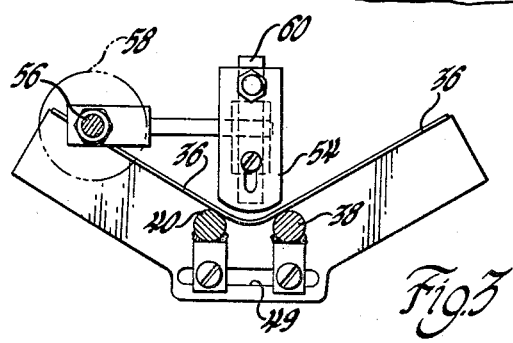
FIG. 3 is a sectional view taken substantially on the line 3—3 of FIG. 2 looking in the direction of the arrows.
Figure 2:
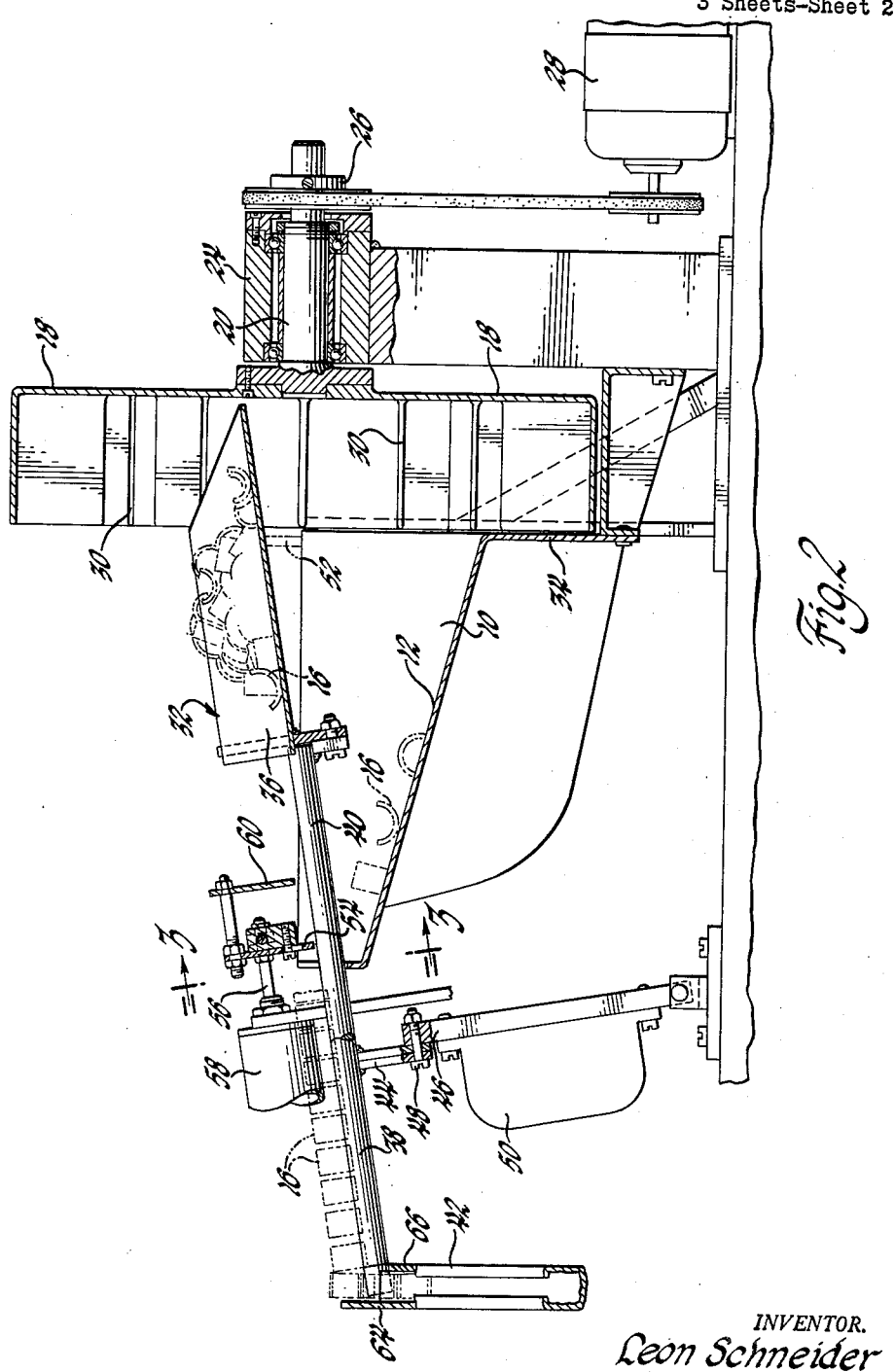
FIG. 2 is a longitudinal view on an enlarged scale of the machine, namely a section on the line 2—2 of FIG. 1, but partly in elevation.

The chute is preferably but not necessarily of dihedral form, having two planar shell-supporting surfaces 36, and is inclined as shown in FIG. 2. At the lower edge of the chute are two inclined, shell-orienting and supporting rods or rails 38 and 40 which extend to a point remote from the chute to discharge ends adjacent a delivery chute or slide 42 which will be discussed in detail below. The discharge ends are preferably free and not supported. At least one of the rods may be attached to the chute and this may form the sole support for the chute, although an auxiliary support may be used in some cases, as will be explained. Each rod is welded to a link 44 and the links are pivotally attached to a support 46 by a bolt 48 which both permits adjustment of the distance between the rods and rigidly secures both the rods and the chute (where attached) to the support 46. The rods may be adjustably secured to each other at their receiving ends by a tie rod 49 (FIG. 3)

Shells 16 dumped at random on the trough or chute 32 will tend to slide off the chute and onto the rods, thence slide along the rods to the delivery end. The rods are spaced apart so that their inner edges, sides or surfaces, are slightly farther apart than the axial length of the shells. Any shells that slide off the chute with their greatest dimension nearly parallel to the rods will fall between the rods into the supply bin to be returned to the chute.

As a shell is jostled in the machine it tends to fall concave side up, due to its shape and the location of the center of gravity. One of the objects of the invention is to make use of this fact by placing and conveying the shells on the rails in this position in which they tend to fall. Of course many shells will fall concave side down in places in the machine in spite of this inherent tendency, and it is an object of the invention to prevent such shells from entering the final delivery chute.

Chute 32 will seldom reverse and retrieve shells with the concave side down. It will, however, retrieve most of the shells falling on the chute with the concave side up, but with their axes not parallel to the center lines of the rods. Without the chute these bearings would fall between the rods. On the chute, the position of the bearings tends to conform with the shape of the chute; in other words, they straighten out. This saves for delivery a great many bearings which otherwise would be lost. This is accomplished by shaping and placing the rails so that they receive and convey shells concave side up and reject those which may be concave side down.

The apex of the dihedral angle determined by the supporting surfaces 36 of the chute is centered as nearly as practical to be equidistant from the two rails. This tends to deliver shells concave side up and centered on the rails. Also in cooperation with the shape and location of the upper surfaces or upper edges of the rails, it tends to reject any shells which are concave side down, so that these fall between or on one side of the rails, To prevent shells lodging on both rails concave side down and remaining so, the rails are arranged so that both ends of a concave-side down shell cannot find substantial support on both rails at the same time. To this end the rails have upper edges or parts of surfaces 49a (FIG. 7) adapted to make contact with a shell and the rails are placed so that these contacting portions are spaced apart a distance slightly different from the length of the chord of the shell, or distance between its ends.

Therefore where any shell is positioned concave side down, one end or the other cannot find permanent support on a rail, and the shell will not lodge on the rails. The rails also, have portions 49b spaced apart materially less than the chord of a shell, so that two portions 49b of the two rails jointly support a shell when it is placed on the rails transversely and concave side down. Both the portions 49a and 49b can be provided by providing the rails with drooping upper surfaces which will not support an end of a concave-side-down shell. The surfaces may droop by being rounded, as shown in the drawings, or they may slope downward so that the end of a shell can find no support. Alternatively the upper supporting lines of the rails may be edges. This prevents both ends of a shell finding simultaneous support on the two rails if the concave side is down, since only one end can lodge on a supporting line and such a shell will fall off the rails.

Alternatively the chute may be omitted in which case the receiving ends of the rods are placed in the rotating drum, to receive directly shells falling from the drum. This will orient and sort shells accurately but the yield of the machine will be less, since the chute arranges transverse to the rails many shells which would be disposed nearly parallel to the rails and thus would fall between the rails. I have found that the chute increases the efficiency of the overall process several fold.

Shells placed on the rails concave side up and transverse to the rails will be supported in stable position and will be conveyed by the rails to the discharge end. If the rails receive the shells concave side up but with the axes of the shells approaching perpendicularity to the rails, that is the length of the shell tends to be parallel to the rails, or nearly so, such shells will fall between the rails. But those shells whose length is perpendicular to the rails, or nearly so, will be supported. Not only will they be supported, but they will, in the course of passing along the rails, gravitate into accurately transverse positions with their ends substantially at the same height.

The efficiency of the machine is increased by moving the shells along the rails to assist gravity. One of the objects of the invention is to provide means for moving the shells along the rails, preferably individually, and it is a particular object to provide means which automatically spaces the shells along the rails in response to their movement. One way of accomplishing this is by vibrating the rods in a direction having a component perpendicular to their length and increasing the amplitude of this vibration as the shells approach the delivery end of the rails. The drawings show how this is done.

The support 46 to which the links 44 are bolted may form the sole support for the rails 38, 40 and the chute 32. The support 46 is movable over a small distance and preferably forms the armature of an electromagnetic vibrator 50. This vibrator vibrates the assembly consisting of the chute and rods if the chute is attached to one of the rods, or it vibrates the assembly of the rods alone if no chute is attached to the rods. The rods vibrate in a direction perpendicular to their length so as to give the shells a motion having a horizontal component. This causes each shell individually to travel down the rails.

In order to space the shells apart, to provide an interval between the shells at the discharge end of the rods, I prefer to progressively increase the amplitude of vibration of each shell as it approaches the discharge end. This may be done for example as shown in FIG. 6 which is a diagram of a principle included in FIG. 2.

The rod 38 is vibrated between positions 38a and 38b by force applied in opposite directions to the support 46. Means may be provided for restraining or limiting movement in response to this vibration at the chute end of the rod. This causes the rods in effect to pivot about the supply end, or some point near it, so that the amplitude of the movement of any point along the rod increases as the point approaches the discharge end. This causes the shells to separate progressively as they approach the discharge end, by giving each shell a progressively greater horizontal movement for a purpose which will be explained.

The chute end of the rods may be restrained in various ways. I have found that a heavy chute alone, or a light chute with its normal load of bearing shells constitutes a mass of sufficiently high inertia to restrain this end sufficiently to satisfactorily separate the shells when the support 46 is vibrated 60 cycles per second with a rod length of substantially the proportions illustrated. Alternatively the chute may have an auxiliary support 52 shown in FIG. 2, but I have achieved satisfactory results without this support, and it is within the scope of my invention to omit it.

Another way of accomplishing this desired variation of amplitude is by making the rods elastic and so proportioning them that their period of free vibration is the same as the period of vibration of the support 46 and so that a standing harmonic vibration is set up in the rod. When this is done it is important that the discharge end vibrate freely at a point between the nodes of the harmonic vibration so that the progressive increase in amplitude of the points along the rods is achieved. Such harmonic vibration may be achieved either with or without the auxiliary support 52 and may be achieved with the rods supported free of the chute 32.

It may happen that shells will tend to pile up, one on top of another at the receiving end of the rods. This may occur, for example if the means, described below, which transfers the shells from the delivery ends of the rods is full, or is not functioning, so that the rods or rails are substantially filled with shells, and shells fall from the mass in the chute 32 onto one or more properly oriented shells concave side up on the rails near the chute. In such cases, which are infrequent, the piled up shells are not as responsive as they should be to the automatic sorting and orienting action of the rails.

To insure against this contingency it is one of the objects of the invention to provide an excess shell remover. This may be done by placing the excess shell removing assembly shown above the rails in FIG. 2 and shown in end elevation in FIG. 3. This includes a plate 54 rigidly secured to a piston rod 56 secured to a piston, not shown, in a cylinder 58 suitably supported on a fixed part of the machine. The piston and its rod with the cylinder may constitute a reciprocating motor for continuously reciprocating the plate 54 in a path parallel to the rails 38, 40.

The plate is slotted as shown in FIG. 2 so that it may be adjusted toward and from the rails. The shape of the end of the plate conforms in general to the inner face of a shell, and the distance from the rod is so adjusted that the plate reciprocates just inside of properly oriented shells, but will strike any shell piled up. This will push any piled up shells back and keep pushing them back or knocking them off the rails until there is room for such excess shells on the rails.

I may, if it becomes desirable, add a second adjustable plate 60 to the excess shell remover assembly in a position to reciprocate into the chute 32. This may be done when shells tend to pile up too fast in the chute.

The toe of this second plate is farther away from the rails than plate 54, and it may be adjusted to pass over a single shell in the chute, even if the shell is on its side. But the second plate will strike others and keep disturbing and pushing back the pile of shells in the chute preventing the shells feeding too fast onto the rails.

Alternatively a revolving brush may be used, arranged and shaped to conform to the inner surface of a shell when right side up and properly oriented.

While the rods may be vibrated by any means, and by the application of force at any suitable point which progressively increases the amplitude of movement of the shells as they approach the discharge ends, I believe better results are obtained when the force is applied between the ends and have obtained particularly satisfactory results from applying the vibrating force substantially midway between the ends of rods which are approximately 14 times as long as the axial length of a shell or about 23 inches long and made from thick walled steel tubing about one inch in diameter.

I prefer the discharge end of the rod to vibrate freely, that is to project beyond the point at which the vibratory force is applied, and I believe it should project at least about three times the axial length of a shell, this being the distance occupied by two shells plus three separating spaces.

It will be seen that the shells are placed on the rods side by side. It is one of the objects of the invention to discharge the shells from the ends of the rods end to end. This not only makes orderly movement without piling up more certain, but makes delivery into subsequent processing machines easier. This requires stopping the forward movement of the shells as they leave the rods and starting a new movement in a plane at 90 degrees to the rods. This is accomplished by the chute shown in FIGS. 1 and 2. The delivery chute 42 has a cross section to receive shells end to end and permit them to slide easily along it. It is arranged in a plane approximately 90 degrees to the rails, as shown in FIG. 2 and slopes down from the rails at a suitable pitch to assure travel of the shells by gravity at the desired speed as shown in FIG. 1.

The side 64 of the chute 42 is longer than side 66, and extends across both rods to act as a stop for the shells. The rod 40 is longer than the rod 38 and extends to the long side 64 to carry the shells positively into the throat of the discharge chute. The short rod 38 terminates clear of the space between the walls 64, 66 so that as soon as the shell is within the delivery chute it is supported only at one end. Consequently it tumbles into the delivery chute.

This type of delivery chute makes the spacing apart of the shells on the rails very desirable. If spacing were not assured, it could happen that a group of shells filling the rails could press on the shell in the delivery chute with sufficient friction to prevent its sliding down the chute. Spacing as described above completely eliminates this possibility.

Alternatively the shells can be discharged from the rails by a sloping delivery chute 68 in a plane in line with the rods as shown in FIGS. 4 and 5. This receives the shells side by side in the same position in which they were on the rails. This realizes some of the benefits of the invention and has the advantage of simplicity, since the spacing of the shells is of no advantage and can be eliminated. It has the disadvantage, however, of requiring shells to travel with their long dimension perpendicular to the line of motion, and this is more apt to cause binding and jamming than when the shells travel end to end, as in the delivery chute 42 of FIGS. 1 and 2.

I claim:

1. A device for uniformly orienting asymmetrical substantially semi-cylindrical shells of relatively large radius and relatively short axial length, comprising in combination an inclined dihedral chute having shell supporting surfaces, a pair of parallel rails having shell-supporting portions supported substantially in prolongation of the surfaces of the chute, said rails having supply ends at the chute and discharge ends remote from the chute and lower than the supply ends, and means for placing substantially semi-cylindrical asymmetrical shells in random positions on the chute, whereby the shells will travel by gravity from the chute to the discharge ends of the rails, the uppermost parts of the shell-supporting portions of the rails being spaced apart a distance slightly different from the length of the chord of a shell so that shells concave side down cannot be supported simultaneously at both ends, and the innermost portions of the rails being spaced apart a distance which is greater than the axial length of a shell and is sufficiently less than the length of the chord of a shell so that shells positioned transversely on the rails concave side up will be supported by the rails and shells positioned with their axes approaching perpendicularity to the rails will fall between the rails.

2. A device for uniformly orienting asymmetrical substantially semi-cylindrical shells of relatively large radius and relatively short axial length, comprising in combination an inclined trough having a shell supporting surface, a pair of parallel rails having shell supporting portions supported substantially in prolongation of the trough, said rails having supply ends at the trough and discharge ends remote from the trough and lower than the supply ends, means for placing asymmetrical substantially semi-cylindrical shells in random positions on the chute, and means for moving the shells individually along the rails toward the discharge ends of the rails, the shell-supporting portions of the rails being spaced apart a distance slightly different from the length of the chord of a shell so that shells placed on the rails concave side down will fall off, and the innermost portions of the rails being spaced apart a distance which is greater than the axial length of a shell and is sufficiently less than the length of the chord of a shell so that shells positioned transversely on the rails concave side up will be supported by the rails and shells positioned on the rails with their axes approaching perpendicularity to the rails will fall between the rails.

3. A device for uniformly orienting asymmetrical semi-cylindrical shells of relatively large radius and relatively short axial length, comprising in combination an inclined trough having a shell supporting surface, a pair of parallel rails having shell-supporting portions supported substantially in prolongation of the trough, said rails having supply ends at the trough and discharge ends remote from the trough and lower than the supply ends, means for placing asymmetrical substantially semi-cylindrical shells in random positions on the trough, and means for moving the shells individually along the rails toward the discharge ends, the device including means responsive to movement of the shells toward the discharge ends for separating the shells along the rails, the uppermost parts of the shell-supporting portions of the rails being spaced apart a distance slightly different from the length of the chord of a shell so that shells placed on the rails concave side down will fall off, and the innermost portions of the rails being spaced apart a distance which is greater than the axial length of a shell and is sufficiently less than the chord of a shell so that shells positioned transversely on the rails concave side up will be supported by the rails and shells positioned on the rails with their axes approaching perpendicularity to the rails will fall between the rails.

4. A device for uniformly orienting asymmetrical substantially semi-cylindrical shells of relatively large radius and relatively short axial length, comprising in combination an inclined trough having a shell supporting surface, a pair of parallel rails having shell-supporting portions supported substantially in prolongation of the surface of the trough, said rails having supply ends at the trough and discharge ends remote from the trough and lower than the supply ends, means for placing asymmetrical semi-cylindrical shells in random positions on the trough, a movable support for the trough and the rails, and means for vibrating the support to move the shells individually along the rails toward the discharge ends, the uppermost parts of the shell-supporting portions of the rails being spaced apart a distance slightly different from the length of the chord of a shell so that shells placed on the rails concave side down will fall off, and the innermost portions of the rails being spaced apart a distance which is greater than the axial length of a shell and is sufficiently less than the chord of a shell so that shells positioned transversely on the rails concave side up will be supported by the rails and shells positioned on the rails with their axes approaching perpendicularity of the rails will fall between the rails.

5. A device for uniformly orienting asymmetrical substantially semi-cylindrical shells of relatively large radius and relatively short axial length, comprising in combination an inclined trough having a shell supporting surface, a pair of parallel rails having shell-supporting portions supported substantially in prolongation of the surface of the trough, said rails having supply ends at the trough and discharge ends remote from the trough and lower than the supply ends, means for placing asymmetrical semi-cylindrical shells in random positions on the trough, a movable support for the rails and means for vibrating the support to move the shells along the rails toward the discharge ends, the uppermost parts of the shell-supporting portions of the rails being spaced apart a distance slightly different from the length of the chord of a shell so that shells placed on the rails concave side down will fall off, and the innermost portions of the rails being spaced apart a distance which is greater than the axial length of a shell and is sufficiently less than the chord of a shell so that shells positioned transversely on the rails concave side up will be supported by the rails and shells positioned on the rails with their axes approaching perpendicularity to the rails will fall between the rails.

6. A device for uniformly orienting asymmetrical substantially semi-cylindrical shells of relatively large radius and relatively short axial length, comprising in combination an inclined trough having a shell supporting surface, a pair of parallel rails having shell supporting portions supported substantially in prolongation of the trough, said rails having supply ends at the trough and discharge ends remote from the trough and lower than the supply ends, means for placing asymmetrical substantially semi-cylindrical shells in random positions on the trough, and means for vibrating the rails perpendicular to their length, to move the shells individually along the rails towards the discharge ends, the uppermost parts of the shell-supporting portions of the rails being spaced apart a distance slightly different from the length of the chord of a shell, so that shells placed on the rails concave side down will fall off, and the innermost portions of the rails being spaced apart a distance which is greater than the axial length of a shell and is sufficiently less than the chord of a shell so that shells positioned transversely on the rails concave side up will be supported by the rails and shells positioned on the rails with their axes approaching perpendicularity to the rails will fall between the rails.

7. A device for uniformly orienting asymmetrical semi-cylindrical shells of relatively large radius and relatively short axial length, comprising in combination an inclined trough having a shell supporting surface, a pair of parallel rails having shell-supporting portions supported substantially in prolongation of the surface of the trough, said rails having supply ends at the trough and discharge ends remote from the trough and lower than the supply ends, means for placing asymmetrical substantially semi-cylindrical shells in random positions on the trough, and means for vibrating the rails perpendicular to their length so that the amplitude of the vibratory motion of a point on the rails progressively increases with decreasing distance of the point from the discharge ends of the rails, the uppermost parts of the shell-supporting portions of the rails being spaced apart a distance approximately equal to the chord of a shell so that shells placed on the rails concave side down will fall off, and the innermost portions of the rails being spaced apart a distance which is greater than the axial length of a shell and is sufficiently less than the chord of a shell so that shells positioned transversely on the rails concave side up will be supported by the rails and shells positioned on the rails with their axes approaching perpendicularity to the rails will fall between the rails.

8. A device for uniformly orienting asymmetrical substantially semi-cylindrical shells of relatively large radius and relatively short axial length, comprising in combination an inclined trough having a shell supporting surface, a pair of parallel rails having shell-supporting portions supported substantially in prolongation of the trough, said rails having supply ends at the trough and discharge ends remote from the trough and lower than the supply ends, means for placing asymmetrical semi-cylindrical shells in random positions on the chute trough, and means for vibrating the rails perpendicular to their length by application of force at a point which is spaced from the discharge ends between the ends of the rails by a distance at least as great as three times the axial length of a shell, the uppermost parts of the shell-supporting portions of the rails being spaced apart a distance slightly different from the length of the chord of a shell, so that shells placed on the rails concave side down will fall off, and the innermost portions of the rails being spaced apart a distance which is greater than the axial length of a shell and is sufficiently less than the chord of a shell so that shells positioned transversely on the rails concave side up will be supported by the rails and shells positioned on the rails with their axes approaching perpendicularity to the rails will fall between the rails.

9. A device for uniformly orienting asymmetrical substantially semi-cylindrical shells of relatively large radius and relatively short axial length, comprising in combination an inclined trough having a shell supporting surface, a pair of parallel rails having shell-supporting portions supported substantially in prolongation of the trough, said rails having supply ends at the trough and discharge ends remote from the trough and lower than the supply ends, means for placing asymmetrical semi-cylindrical shells in random positions on the trough, and means for vibrating the rails perpendicular to their length by application of force approximately midway between the ends of the rails, the uppermost parts of the shell-supporting portions of the rails being spaced apart a distance slightly different from the length of the chord of a shell so that shells placed on the rails concave side down will fall off, and the innermost portions of the rails being spaced apart a distance which is greater than the axial length of a shell and is sufficiently less than the chord of a shell so that shells positioned transversely on the rails concave side up will be supported by the rails and shells positioned on the rails with their axes approaching perpendicularity to the rails will fall between the rails.

10. A device for uniformly orienting asymmetrical substantially semi-cylindrical shells of relatively large radius and relatively short axial length, comprising in combination an inclined trough having a shell supporting surface, a pair of parallel rails having shell-supporting portions supported substantially in prolongation of the trough, said rails having supply ends at the trough and discharge ends remote from the trough and lower than the supply ends, means for placing asymmetrical substantially semi-cylindrical shells in random positions on the trough, the device including means for limiting motion of the supply ends of the rails, and means for vibrating the rails in a direction having a component of motion perpendicular to their length by application of force at a point between the ends of the rails, the uppermost parts of the shell-supporting portions of the rails being spaced apart a distance slightly different from the length of the chord of a shell so that shells placed on the rails concave side down will fall off, and the innermost portions of the rails being spaced apart a distance which is greater than the axial length of a shell and is sufficiently less than the chord of a shell so that shells positioned transversely on the rails concave side up will be supported by the rails and shells positioned on the rails with their axes approaching perpendicularity to the rails will fall between the rails.

11. A device for uniformly orienting asymmetrical substantially semi-cylindrical shells of relatively large radius and relatively short axial length, comprising in combination an inclined trough having a shell supporting surface, a pair of parallel rails having shell-supporting portions supported substantially in prolongation of the trough, said rails having supply ends attached to the trough and discharge ends remote from the trough and lower than the supply ends, means for placing asymmetrical substantially semi-cylindrical shells in random positions on the trough, means for vibrating the rails in a direction having a component of motion perpendicular to their length by application of force between the ends of the rails, the trough with its normal load of shells constituting a mass of substantial inertia which restricts vertical vibratory motion of the supply ends of the rails so that the amplitude of vibration of a point on the rails increases as the distance of the point from the discharge ends of the rails decreases, the uppermost parts of the shell-supporting portions of the rails being spaced apart a distance slightly different from the length of the chord of a shell so that shells placed on the rails concave side down will fall off, and the innermost portions of the rails being spaced apart a distance which is greater than the axial length of a shell and is sufficiently less than the chord of a shell, so that shells positioned transversely on the rails concave side up will be supported by the rails and shells positioned on the rails with their axes approaching perpendicularity to the rails will fall between the rails.

12. A device for orienting a symmetrical semi-cylindrical shells of relatively large radius and relatively short axial length, comprising in combination an inclined trough having a shell supporting surface, a pair of parallel rails having shell-supporting portions supported substantially in prolongation of the trough, said rails having supply ends at the trough and discharge ends remote from the trough and lower than the supply ends, means for placing semi-cylindrical shells in random positions on the trough whereby the shells can travel from the trough to the discharge ends of the rails, a stop at the discharge ends of the rails, and a delivery chute extending from the stop in a plane transverse to the rails, the uppermost parts of the shell-supporting portions of the rails being spaced apart a distance slightly different from the length of the chord of a shell so that shells placed on the rails concave side down will fall off, and the innermost portions of the rails being spaced apart a distance which is greater than the axial length of a shell and is sufficiently less than the chord of a shell so that shells positioned on the rails with their axes approaching perpendicularity to the rails will fall between the rails, and shells positioned transversely of the rails concave side up can slide down the rails and into the delivery chute, the cross section of the delivery chute conforming to the axial length of the shells to convey the shells end-to-end away from the rails.

13. A device for orienting asymmetrical semi-cylindrical shells of relatively large radius and relatively short axial length, comprising in combination an inclined trough having shell supporting surfaces, a relatively long rail, a relatively short rail parallel to the long rail, said rails having shell-supporting portions supported substantially in prolongation of the trough, said rails having supply ends at the trough and discharge ends remote from the trough and lower than the supply ends, means for placing semi-cylindrical shells in random positions on the trough whereby the shells can travel from the trough to the discharge ends of the rails, and a delivery chute extending from the discharge ends of the rails in a plane transverse to the rails, said delivery chute having a long side disposed adjacent the long rail and a short side disposed adjacent the short rail, so that shells descending the rails will be supported into the delivery chute and dropped into the delivery chute, the shell-supporting portions of the rails being spaced apart a distance slightly different from the length of the chord of a shell so that shells placed on the rails concave side down will fall off, and the innermost portions of the rails being spaced apart a distance which is greater than the axial length of a shell and is sufficiently less than the chord of a shell so that shells positioned on the rails with their axes approaching perpendicularity to the rails fall between the rails, and shells positioned transversely of the rails concave side up can slide down the rails and into the delivery chute, the cross section of the delivery chute conforming to the axial length of the shells to convey the shells end-to-end away from the rails.

14. A device for orienting asymmetrical semi-cylindrical shells of relativey large radius and relatively short axial length, comprising in combination an inclined trough having a shell supporting surface, a relatively long rail, a relatively short rail parallel to the long rail, said rails having shell-supporting portions supported substantially in prolongation of the trough, said rails having supply ends at the trough and discharge ends remote from the trough and lower than the supply ends, means for placing semi-cylindrical shells in random positions on the trough whereby the shells can travel by gravity from the trough to the discharge ends of the rails, and an inclined delivery chute extending from the discharge ends of the rails in a plane transverse to the rails, the delivery chute having a long side adjacent the long rail and a short side adjacent the short rail and the bottom of the chute at the short rail being lower than the bottom of the chute at the long rail, the shell-supporting portions of the rails being spaced apart a distance slightly different from the length of the chord of a shell so that shells placed on the rails concave side down will fall off, and the innermost portions sides of the rails being spaced apart a distance which is greater than the axial length of a shell and is sufficiently less than the chord of a shell, so that shells positioned on the rails with their axes approaching perpendicularity to the rails will fall between the rails, and shells positioned transversely of the rails concave side up will slide down the long rail into the delivery chute and will be dropped by the short rail onto the bottom of the delivery chute, the cross section of the delivery chute conforming to the axial length of a shell to convey the shells end-to-end away from the rails.

15. A device for uniformly orienting asymmetrical substantially semi-cylindrical shells of relatively large radius and relatively short axial length, comprising in combination an inclined shell-supporting trough, a pair of parallel rails providing only line contact with such shells and extending substantially in prolongation of the trough, said rails having supply ends which receive shells from the trough and discharge ends remote from the trough and lower than the supply ends, and means for placing substantially semi-cylindrical shells in random positions on the trough whereby the shells can travel from the trough to the discharge ends of the rails, the rails being unobstructed substantially throughout their length both above and between the rails and being placed so that their lines of contact are spaced apart a distance slightly different from the length of the chord of a shell so that shells placed on the rails concave side down will fall off, and the innermost portions of the rails being spaced apart a distance which is greater than the axial length of a shell and sufficiently less than the chord of a shell so that shells positioned transversely on the rails concave side up will be supported by the rails and shells positioned on the rails with their axes approaching perpendicularity to the rails will fall between the rails.

16. A device for uniformly orienting substantially semi-cylindrical shells of relatively long radius and relatively short axial length, comprising in combination, a pair of substantially parallel rails having supply ends and discharge ends lower than the supply ends, each rail having a smooth upper surface which provides a portion adapted to make substantially line contact with a shell, the rails being unobstructed substantially throughout their length both above and between the rails and being so positioned that such line contact portions are spaced apart a distance slightly different from the length of the chord of a shell so that shells positioned concave side down cannot lodge on the rails, the innermost portions of the rails being spaced apart a distance greater than the axial length of a shell but less than the chord of a shell so that shells placed transversely on the rails concave side up will be supported and shells not positioned transversely will fall between the rails, and means for placing semi-cylindrical shells in random positions adjacent the supply ends of the rails whereby transversely oriented shells concave side up can travel to the discharge ends of the rails.

17. A device for uniformly orienting substantially semi-cylindrical shells of relatively long radius and relatively short axial length, comprising in combination, a pair of substantially parallel rails having supply ends and discharge ends lower than the supply ends, each rail having a drooping upper surface which provides a portion adapted to make substantially line contact with a shell, the rails being unobstructed substantially throughout their length both above and between the rails and being so positioned that such line contact portions are spaced apart a distance slightly different from the length of the chord of a shell so that shells positioned concave side down cannot lodge on the rails, the innermost portions of the rails being spaced apart a distance greater than the axial length of a shell but less than the chord of a shell so that shells placed transversely on the rails concave side up will be supported and shells not positioned transversely will fall between the rails, and means for placing semi-cylindrical shells in random positions adjacent the supply ends of the rails whereby transversely oriented shells concave side up can travel to the discharge ends of the rails.

18. A device for uniformly orienting substantially semi-cylindrical shells of relatively long radius and relatively short axial length, comprising in combination, a pair of substantially parallel rails having suppy ends and discharge ends lower than the supply ends, each rail having a smooth upper surface which provides a portion adapted to make substantially line contact with a shell, the rails being so positioned that such line contact portions are spaced apart a distance slightly different from the length of the chord of a shell so that shells positioned concave side down cannot lodge on the rails, the innermost portions of the rails being spaced apart a distance greater than the axial length of a shell but less than the chord of a shell so that shells placed transversely on the rails concave side up will be supported and shells not positioned transversely will fall between the rails, means for placing semi-cylindrical shells in random positions adjacent the supply ends of the rails, means vibrating the rails in a direction having a component perpendicular to their length, and a mass in contact with the supply ends of the rails which mass has sufficient inertia to restrain movement of the supply ends in response to the vibration.

19. A device for uniformly orienting substantially semi-cylindrical shells of relatively long radius and relatively short axial length, comprising in combination, a pair of substantially parallel rails having supply ends and discharge ends lower than the supply ends, each rail having a smooth upper surface which provides a portion adapted to make substantially line contact with a shell, the rails being unobstructed substantially throughout their length both above and between the rails and being so positioned that such line contact portions are spaced apart a distance slightly less than the length of the chord of a shell so that shells positioned concave side down cannot lodge on the rails, the innermost portions of the rails being spaced apart a distance greater than the axial length of a shell but less than the chord of a shell so that shells placed transversely on the rails concave side up will be supported and shells not positioned transversely will fall between the rails, means for placing semi-cylindrical shells in random positions adjacent the supply ends of the rails, a stop at the discharge ends of the rails, and a delivery chute extending from the stop in a plane transverse to the rails, the delivery chute having a cross section conforming to the axial length of the shells to convey the shells end-to-end away from the rails.

20. The method of sorting a plurality of randomly arranged substantially semi-cylindrical shells having chordal dimensions substantially greater than axial dimensions, characterized by tumbling and continuously circulating the shells in a closed path, aligning axially circulating shells, progressively moving the aligned shells in the direction of such axial alignment, holding those axially aligned shells which are concave side up while permitting all other shells to circulate, and moving the shells so held axially out of the circuating path.

21. The method as defined in claim 20, further characterized by turning some of the axially aligned shells into substantial circumferential alignment not later than the step of holding the axially aligned shells.

References Cited in the file of this patent

UNITED STATES PATENTS

| | | |
|---|---|---|
| 1,862,351 | Hagiwara | June 7, 1932 |
| 2,832,457 | Randles | Apr. 29, 1958 |

FOREIGN PATENTS

| | | |
|---|---|---|
| 52,275 | Sweden | Apr. 19, 1917 |

UNITED STATES PATENT OFFICE
CERTIFICATE OF CORRECTION

Patent No. 3,063,543                                         November 13, 1962

Leon Schneider

It is hereby certified that error appears in the above numbered patent requiring correction and that the said Letters Patent should read as corrected below.

Column 1, line 35, after "improved" insert -- method for sorting bearing shells and improved --; column 6, line 27, for "chute" read -- trough --; column 7, line 22, after "shells" insert -- individually --; column 8, line 17, strike out "chute"; column 9, line 35, for "a symmetrical" read -- asymmetrical --; column 12, line 36, after "axially" insert -- some of the --.

Signed and sealed this 18th day of June 1963.

(SEAL)
Attest:

ERNEST W. SWIDER
Attesting Officer

DAVID L. LADD
Commissioner of Patents